Oct. 2, 1928.
P. W. LEHMAN
1,686,282
TIRE BUILDING MACHINE
Filed May 19, 1926
3 Sheets-Sheet 2
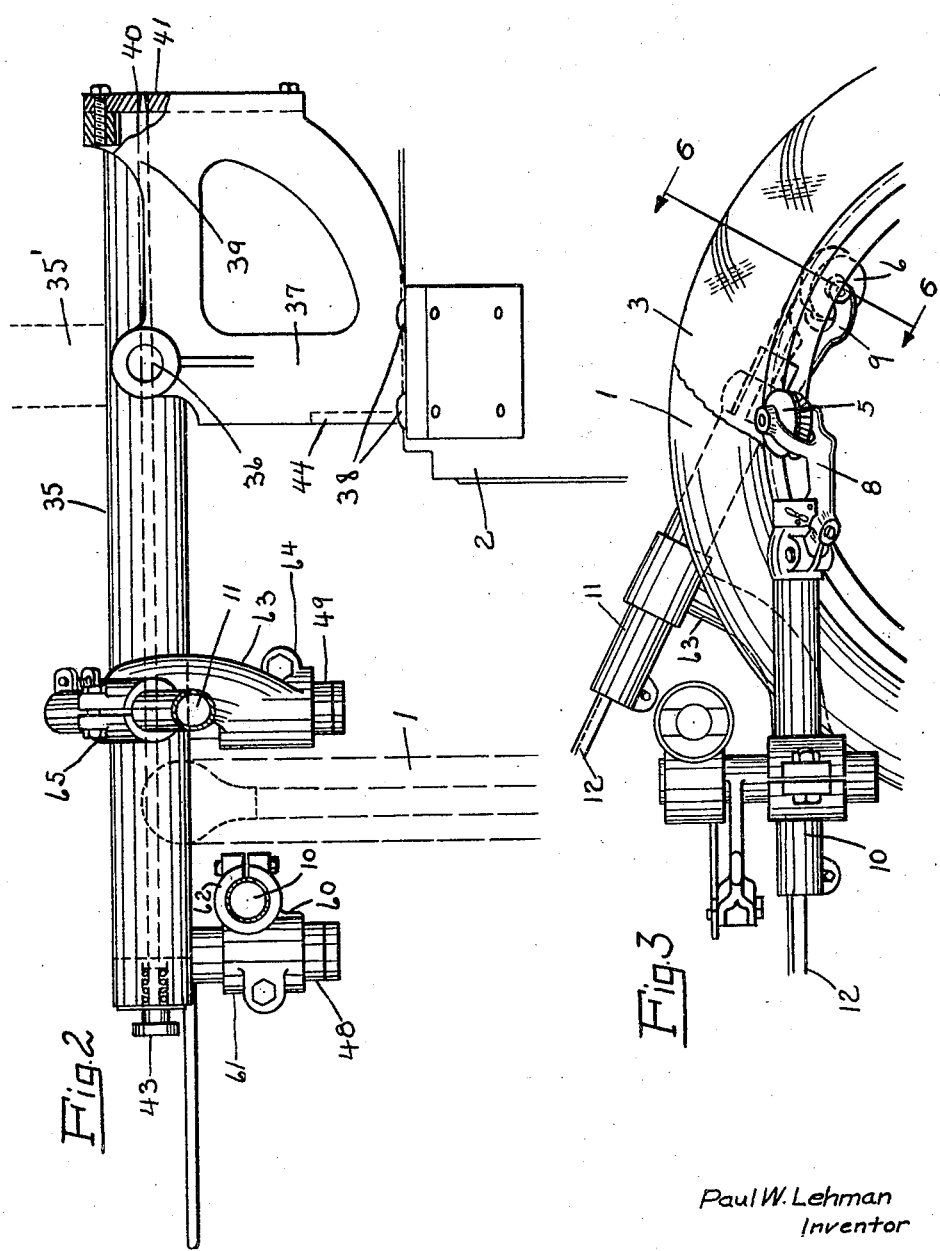
Paul W. Lehman
Inventor
By (signature)
Attorney Oct. 2, 1928.
P. W. LEHMAN
1,686,282
TIRE BUILDING MACHINE
Filed May 19, 1926   3 Sheets-Sheet 3
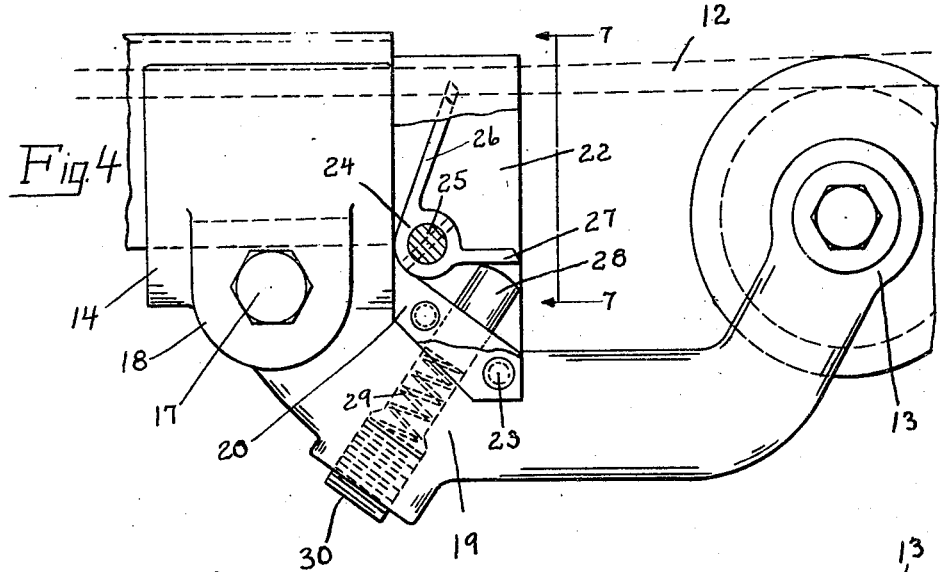
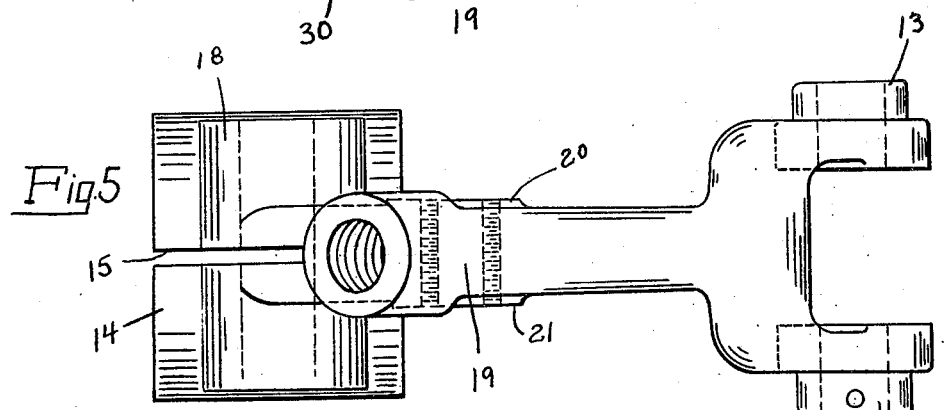
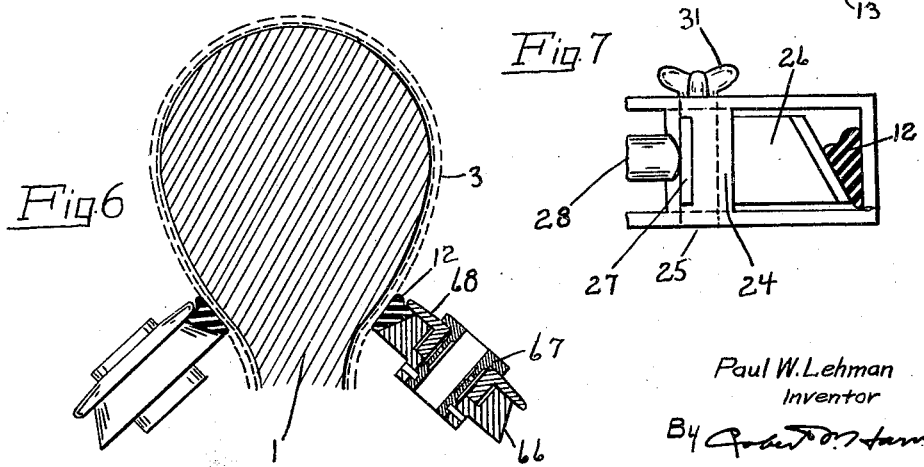
Paul W. Lehman
Inventor
By Robert D. Harvey
Attorney Patented Oct. 2, 1928.

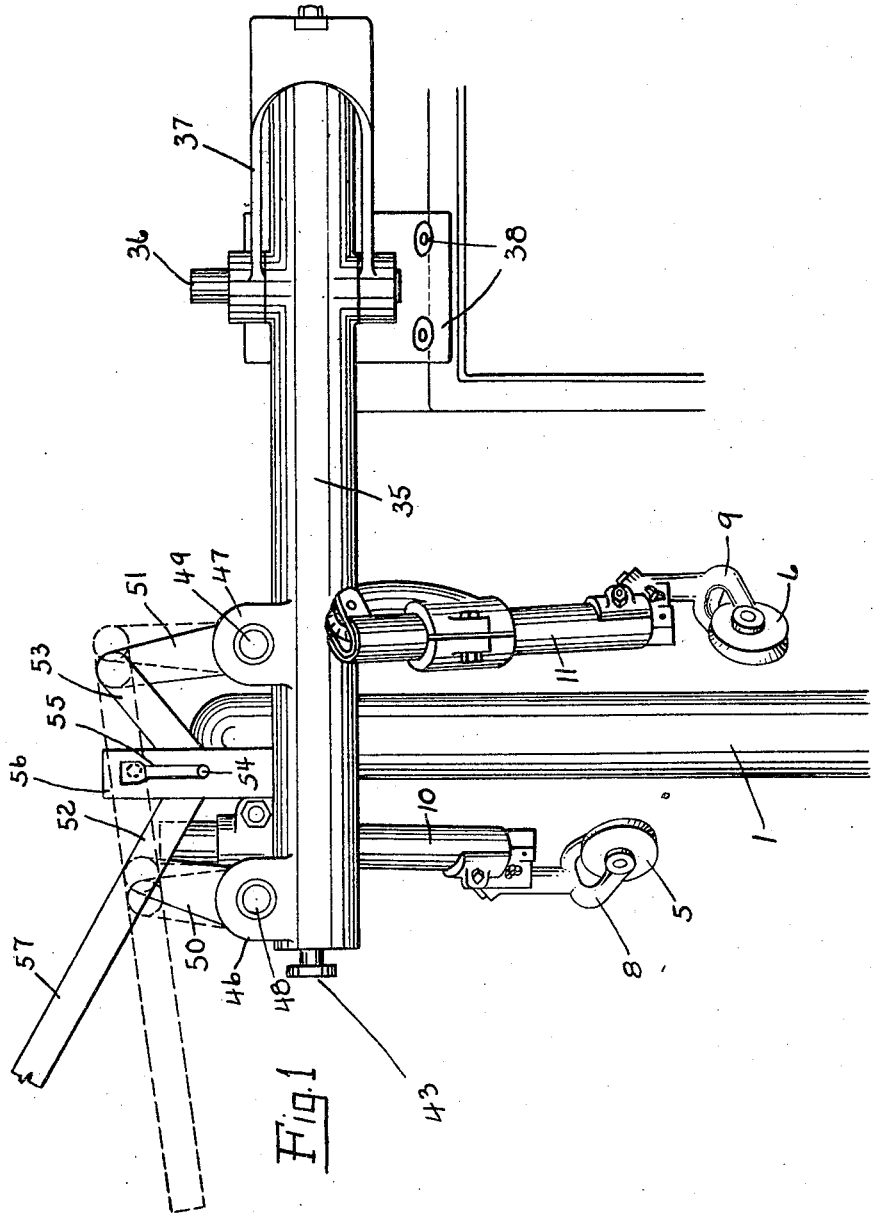

1,686,282

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed May 19, 1926. Serial No. 110,148.

My invention relates to machines for building pneumatic tire casings, and more particularly to means for applying clincher bead elements to the tire carcass.

It is among the objects of my invention to provide a device which will accurately apply the bead material simultaneously to both sides sides of the core and in such manner that the material may be supplied from reels containing a sufficient length of material to form a relatively large number of beads.

A further object is to provide means for automatically controlling the amount of bead material applied.

Other and further objects will be apparent from the following specification and claims:

In the accompanying drawings, which illustrate one embodiment of my invention,

Figure 1 is a plan view, showing the bead applying rolls in inoperative position with respect to the building core, Figure 2 is a front elevation partly in section of the structure shown in Figure 1.

Figure 3 is a side elevation showing the applying rolls in operative position,

Figure 4 is a detail plan view on an enlarged scale of one of the applying rolls and associated parts, Figure 5 is a side view, on a larger scale, of the applying roll fork, Figure 6 is a diagrammatic section, substantially on line 6—6 of Figure 3 showing the manner in which the bead material is applied, and Figure 7 is a detail view of the bead detent.

Referring to the drawings 1 designates the rotatable form or core of a tire building machine a portion of the frame of the latter being indicated at 2. It will be understood that the form or core may have any desired shape such as a flat pulley or the shaped core shown, and that the first plies of carcass material 3 have been placed on the form and prepared for the application of the beads. The bead applying mechanism comprises two rolls 5 and 6 positioned on either side of the form and at an angle with respect to the plane of the latter. Rolls 5 and 6 are adapted to be moved toward and from the form to apply a length of bead material progressively in proper position on the carcass as the form rotates. The rolls 5 and 6 (later more specifically described) are mounted respectively in forks 8 and 9 adjustably secured to hollow arms 10 and 11, through which the bead material 12 is supplied to rolls 5 and 6 from reels or other suitable source of supply, not shown, as best shown in Figures 4 and 5 forks 8 and 9, which are identical in structure, are provided with bearings 13 for the shafts of the applying rolls. The shank of the fork is provided at its end with a cylindrical member 14 split at 15 and adapted to be clamped to its supporting arm 10 or 11 by means of a suitable bolt or screw 17 passing through boss 18 formed integral with member 14. The shank of the fork is provided adjacent member 14 with an enlarged shoulder 19 provided with flat surfaces 20 and 21 upon which is secured a U shaped guide 22 by means of screws or bolts 23 passing through the shank of the fork. Guides 22, one of which is shown in detail in Figure 7, form a continuation of arms 10 and 11 and are each provided with a detent 24 pivoted at 25 in the guide and adapted to prevent backward movement of the bead material. This detent is of angular form one arm 26 engaging the bead material while the other arm 27 is engaged by a tension applying pin 28 mounted in the shank and actuated by a springs 29 to maintain the arm 26 in contact with the bead material. The degree of pressure exerted by spring 29 is controlled by plug 30 threaded in the shank. The action of pin 28 applies tension to the bead strip as it is applied and makes it possible to control the amount of bead strip applied to the carcass. The pivot of the detent is provided with a wing grip 31 to permit the operator to release the detent if desired.

Arms 10 and 11 with their associated parts are mounted to be swung toward and from the plane of the form and to be removed bodily from proximity to the latter when not in use. As best shown in Figures 1, 2 and 3 this mounting comprises a bar 35 pivoted at 36 in a vertical bracket 37 secured to frame 2 of the building machine by screws or bolts 38. The bar 35 is provided with a spring pressed locking pin 39 adapted to engage a seat 40 formed in a plate 41 secured to the bracket 37 and maintain bar 35 in operative position. Pin 39 is provided with a head 43 by means of which bar 35 may be released and swung to vertical position 35¹, indicated in dotted lines in Figure 2, when the bead applying instrumentalities are not in use, permitting free access to the form for other operations. A stop 44 is formed in bracket 37 to maintain bar 35 in vertical position. The free end of bar 35 is provided with bosses 46 and 47 in which are respectively journaled stub shafts 48 and 49, provided with rearwardly extending arms 50 and 51 connected together by toggle arms 52 and 53. Pin 54 joining arms 52 and 53 is adapted to ride in a slot 55 formed in a guide 56 secured to bar 35, thus equalizing the movement of shafts 48 and 49 as the toggle is set and broken. Toggle arm 52 is extended beyond arm 50 to form an operating handle 57. Arm 10 is adjustably secured to stub shaft 48 by a member 60 formed with a split collar 61 engaging the shaft and a split collar 62 engaging the arm 10. Arm 11 is similarly secured to stub shaft 49 by means of member 63 formed with split collars 64 and 65 engaging respectively shaft 49 and arm 11. As clearly shown in Figure 3 member 63 is curved upwardly and forwardly so that roll 6 engages the form a suitable distance beyond the point of engagement of roll 5. This staggered relation of the applying rolls prevents the bead splices from coming directly opposite each other.

It will be understood that rolls 5 and 6 may take various shapes depending on the character and contour of the bead used. Where the conventional clincher bead of triangular cross section is used I prefer a roll construction such as shown in Figure 6, which comprises a beveled applying roll 66 secured to bushing 67 and engaging the outer face of the bead, and a flat guide roll 68, rotatable independently of roll 66 and bushing 67, adapted to engage the upper face of the bead and maintain it in position as it is applied.

The operation may be summarized as follows. With bead material threaded through arms 10 and 11 and the ends held in proper position against rolls 5 and 6 by detents 24, arm 35 is swung from dotted line position in Figure 2 to the full line position of that figure, the arms 10 and 11 being separated as shown in Figure 1. The operator then sets the toggle 52—53, as shown in dotted lines in the latter figure, thus moving arms 10 and 11 inwardly causing rolls 5 and 6 to press the ends of the bead material in proper position on the tire carcass supported on the form. The form is then set in rotation drawing the bead material forward through arms 10 and 11, rolls 5 and 6 accurately positioning and applying it as the rotation progresses. When the starting point is reached the bead material is cut just in front of the rolls and arm 35 moved back to the dotted position of Figure 2 until again needed.

I claim:

1. A device of the character described, comprising a bead applying roll adapted to be positioned adjacent a rotatable tire building form, holding means to position the end of a strip of bead material between the roll and the form and means to move the roll toward the form to press the end of the bead strip against a tire carcass supported on the form and apply the bead material in desired position on the carcass as the form is rotated.

2. A device of the character described, comprising a bead applying roll adapted to be positioned adjacent a rotatable tire building form, holding means associated with the roll, and movable therewith, to position the end of a strip of bead material between the roll and the form, and means to move the roll toward the form to press the end of the bead strip against a tire carcass supported on the form and apply the bead material in desired position on the carcass as the form is rotated.

3. A device of the character described, comprising bead applying rolls adapted to be positioned in staggered relation on opposite sides of a rotatable building form, holding means to position the ends of strips of bead material between the rolls and the form and means to simultaneously move the rolls toward the form to press the ends of the bead strips against a tire carcass supported on the form and apply the bead material in desired position on the carcass as the form is rotated.

4. A device of the character described, comprising bead applying rolls adapted to be positioned on opposite sides of a rotatable building form, holding means to position the ends of strips of bead material between the rolls and the form and means to simultaneously move the rolls toward the form to press the ends of the bead strips against a tire carcass supported on the form and apply the bead material in desired position on the carcass as the form is rotated.

5. A device of the character described, comprising bead applying rolls adapted to be positioned in staggered relation on opposite sides of a rotatable building form, holding means associated with the rolls, and movable therewith, to position the ends of strips of bead material between the rolls and the form and means to simultaneously move the rolls toward the form to press the ends of the bead strips against a tire carcass supported on the form and apply the bead material in desired position on the carcass as the form is rotated.

6. A device of the character described, comprising bead applying rolls adapted to be positioned on opposite sides of a rotatable building form, tubular supports for the rolls adapted to guide strips of bead material to the rolls, means associated with the rolls to position the ends of the bead strips between the rolls and the form and means to simultaneously move the tubular supports and associated parts toward and from the form to press the ends of the bead strips against a tire carcass supported on the form and apply the bead material in desired position on the carcass as the form is rotated.

7. A device of the character described comprising bead applying rolls adapted to be positioned on opposite sides of a rotatable building form, tubular supports for the rolls adapted to guide strips of bead material to the rolls, detents positioned between the adjacent ends of the tubular supports and their respective rolls to position the ends of the bead strips between the rolls and the form and a toggle connecting the tubular supports to simultaneously move the rolls toward and from the form to press the ends of the bead strips against a tire carcass supported on the form and apply the bead material in desired position on the carcass as the form is rotated.

8. A device of the character described comprising a bead applying roll adapted to be moved toward and from a rotatable building form, means to move the roll toward the form to press the end of a strip of bead material in desired position against a tire carcass supported on the form and means to apply a predetermined degree of tension to the bead strip as it passes to the applying roll, whereby a predetermined amount of bead material is applied to the carcass upon rotation of the form.

9. A device of the character described, comprising bead applying rolls adapted to be moved toward and from a rotatable building form, means to position the ends of strips of bead material between the rolls and the form, means to simultaneously move the rolls toward the form to press the ends of the bead strips against a tire carcass supported on the form and to apply the bead material in desired position on the carcass as the form is rotated and means associated with the bead strip positioning means to apply a predetermined degree of tension to the bead strip as the latter is applied to the core.

10. A device of the character described comprising bead applying rolls adapted to be moved toward and from a rotatable building form, tubular supports for the rolls adapted to guide strips of bead material to the rolls, detents positioned between the adjacent ends of the tubular supports and their respective rolls to position the ends of the bead strips between the rolls and the form, a toggle connecting the tubular supports to simultaneously move the rolls toward and from the form to press the ends of the bead strips against a tire carcass supported on the form and to apply the bead material in desired position on the carcass as the form is rotated and means acting on the detent to apply a predetermined degree of tension to the bead strips as the latter is applied to the core.

11. In a device of the character described, a forked member, a bead applying roll journaled in the fork, means at the end of the shank of the fork to adjustably secure the latter to a support and a detent positioned between the securing means and the roll to position the end of a strip of bead material adjacent the roll.

12. In a device of the character described, a forked member, a bead applying roll journaled in the fork, means at the end of the shank of the fork to adjustably secure the latter to a support, a bead positioning detent positioned between the securing means and the roll and means acting on the detent to apply a predetermined degree of tension to the bead as the latter passes the detent.

In testimony whereof I have signed my name to the above specification.

PAUL W. LEHMAN.